(12) United States Patent
Kakizaki et al.

(10) Patent No.: US 6,636,546 B2
(45) Date of Patent: Oct. 21, 2003

(54) ARF AND KRF EXCIMER LASER APPARATUS AND FLUORINE LASER APPARATUS FOR LITHOGRAPHY

(75) Inventors: Koji Kakizaki, Gotenba (JP); Yoichi Sasaki, Gotenba (JP)

(73) Assignee: Ushio Denki Kabushiki Kaisya, Tokyo (JP)

( * ) Notice: Subject to any disclaimer, the term of this patent is extended or adjusted under 35 U.S.C. 154(b) by 134 days.

(21) Appl. No.: 09/971,090

(22) Filed: Oct. 3, 2001

(65) Prior Publication Data

US 2002/0071469 A1 Jun. 13, 2002

(30) Foreign Application Priority Data

Oct. 10, 2000 (JP) .......................... 2000-309270

(51) Int. Cl.$^7$ .............................................. H01S 3/22
(52) U.S. Cl. ........................................................ 372/57
(58) Field of Search ............................................ 372/57

(56) References Cited

U.S. PATENT DOCUMENTS

| | | | | |
|---|---|---|---|---|
| 5,072,191 A | * | 12/1991 | Nakajima et al. | 327/300 |
| 5,184,085 A | * | 2/1993 | Nakajima et al. | 327/181 |
| 6,028,872 A | * | 2/2000 | Partlo et al. | 372/38.04 |
| 6,128,323 A | * | 10/2000 | Myers et al. | 372/38.1 |
| RE38,054 E | * | 4/2003 | Hofmann et al. | 372/25 |
| 2002/0071469 A1 | * | 6/2002 | Kakizaki et al. | 372/57 |

FOREIGN PATENT DOCUMENTS

| | | |
|---|---|---|
| EP | 1 085 623 | 3/2001 |
| EP | 1 091 462 | 4/2001 |
| EP | 1 111 744 | 6/2001 |
| EP | 1 137 132 | 9/2001 |
| JP | 63-110780 | 5/1988 |

OTHER PUBLICATIONS

L. Feenstra et al, "A Long Pulse Discharge Excited ArF Laser", IEEE Journal of Selected Topics in Quantum Electronics, vol. 5, No. 6 (1999) pp. 1515–1521.
A. Ershov et al, "Performance characteristics of ultra–narrow ArF laser for DUV lithography", SPIE, vol. 3679 (1999) pp. 1030–1037.
Mituo Maeda, "Excimer Laser", Aug. 20, 1993, pp. 62–65 and end page.

* cited by examiner

Primary Examiner—Leon Scott, Jr.
(74) Attorney, Agent, or Firm—Dellett and Walters

(57) ABSTRACT

The present invention relates to an ArF excimer laser apparatus for lithography capable of stretching the laser pulse width even when the repetition rate exceeds 4 kHz and also relates to a KrF excimer laser apparatus and fluorine laser apparatus for lithography capable of stretching the laser pulse width even when the repetition rate exceeds 2 kHz. In a laser apparatus for lithography having laser discharge electrodes disposed in a laser chamber and a peaking capacitor connected in parallel to the laser discharge electrodes, the period Tn of the waveform of an oscillating current flowing in a first circuit loop formed by the final-stage capacitor of a magnetic pulse compression circuit and the laser discharge electrode and the period Tp of the waveform of an oscillating current flowing in a second circuit loop formed by the peaking capacitor and the laser discharge electrodes satisfy the condition of 5Tp≦Tn, and the period Tn satisfies the condition of Tn<250 ns, whereby a laser oscillating operation is performed by at least 2.5 cycles of the oscillating current flowing between the laser discharge electrodes.

5 Claims, 8 Drawing Sheets

ARF AND KRF EXCIMER LASER APPARATUS AND FLUORINE LASER APPARATUS FOR LITHOGRAPHY

BACKGROUND OF THE INVENTION

The present invention relates to ArF and KrF excimer laser apparatus and fluorine laser apparatus for lithography. More particularly, the present invention relates to gas laser apparatus for lithography, e.g. ArF excimer laser apparatus, KrF excimer laser apparatus, and fluorine laser apparatus, which perform a lasing operation with a long laser oscillation pulse width.

With the achievement of small, fine and high-integration semiconductor integrated circuits, it has been demanded that projection exposure systems for the manufacture of such highly integrated circuits be improved in resolution. Under these circumstances, the wavelength of exposure light emitted from light sources for lithography is becoming shorter. At present, KrF excimer laser apparatus are used as light sources for lithography. ArF excimer laser apparatus and fluorine laser apparatus are promising as next-generation light sources for semiconductor lithography.

In these excimer laser apparatus, a laser gas is sealed in a laser chamber under several hundred kPa. That is, in the KrF excimer laser, a mixed gas of fluorine ($F_2$) gas, krypton (Kr) gas and a rare gas, e.g. neon (Ne), as a buffer gas is sealed in the laser chamber as a laser gas. In the ArF excimer laser, a mixed gas of fluorine ($F_2$) gas, argon (Ar) gas and a rare gas, e.g. neon (Ne), as a buffer gas is similarly sealed in the laser chamber as a laser gas. In the fluorine laser, a mixed gas of fluorine ($F_2$) gas and a rare gas, e.g. neon (Ne), as a buffer gas is similarly sealed in the laser chamber as a laser gas. In these apparatus, the laser gas as a laser medium is excited by generating an electric discharge in the laser chamber.

These laser apparatus emit laser beams having a wide spectral linewidth. Therefore, in order to avoid the problem of chromatic aberration in the projection optical system mounted in the exposure system, it is necessary that the spectral linewidth be narrowed down to 1 pm or less. Narrowing of the spectral linewidth is realized by placing a line-narrowing optical system comprising, for example, a magnifying prism and a diffraction grating, in the laser resonator.

Incidentally, the ArF excimer laser apparatus have an oscillation center wavelength of 193.3 nm, which is shorter than the oscillation center wavelength of the KrF excimer laser apparatus presently used as light sources for lithography, i.e. 248 nm. Accordingly, quartz used as a vitreous material in the projection lens system of a stepper or other exposure system is damaged to a larger extent than in the case of using KrF excimer laser apparatus, resulting in a reduction in lifetime of the lens system.

Damage to quarts includes color-center formation due to two-photon absorption and a compaction (an increase in refractive index). The former appears as a reduction in transmittance, and the latter as a reduction in resolution of the lens system. The influence of the damage is in inverse proportion to the laser pulse width ($T_{is}$), which is defined by the following equation, when the laser pulse energy is assumed to be constant:

$$T_{is}=(\int T(t)dt)^2/\int (T(t))^2 dt \quad (1)$$

where T(t) is a temporal laser pulse shape.

Let us describe the definition of the laser pulse width $T_{is}$. Assuming that an optical element is damaged by two-photon absorption, because the damage is proportional to the square of the laser light intensity, the damage D accumulated per pulse is given by $$D=k\cdot\int(P(t))^2 dt \quad (2)$$

where k is a constant determined by a substance, and P(t) is a temporal laser intensity (MW).

The laser intensity P(t) may be separated into time and energy by the following equation:

$$P(t)=I\cdot T(t)/\int T(t')dt' \quad (3)$$

where I is energy (mJ), and T(t) is a temporal laser pulse shape.

Temporally integrating P(t) gives I. In the case of ArF excimer laser, I is 5 mJ, for example.

If Eq. (3) is substituted into Eq. (2), the damage D is expressed by $$D=k\cdot I^2\cdot\int (T(t)/\int T(t')dt')^2 dt = k\cdot I^2\cdot\int (T(t))^2 dt/(\int T(t)dt)^2 \quad (4)$$

Substituting Eq. (1) into Eq. (4), we obtain $$D=k\cdot I^2/T_{is} \quad (5)$$

From Eq. (5), the pulse width $T_{is}$, which is in inverse proportion to the damage D, is defined by Eq. (1) because $k\cdot I^2$ is constant (I is maintained at a constant value).

There have heretofore been cases where the laser pulse width is defined by the full width at half maximum (FWHM) of the temporal laser pulse shape. When the laser pulse width is defined by the full width at half maximum, different temporal laser pulse shapes may become equal to each other in laser pulse width as shown in the model diagram of FIG. 8. In the example shown in FIG. 8, however, the actual laser pulse durations of the two temporal laser pulse shapes are different from each other. That is, the pulse duration of the triangular laser pulse shape is longer than that of the rectangular laser pulse shape. Meanwhile, in the case of the laser pulse width $T_{is}$ defined by Eq. (1), the laser pulse width $T_{is}$ of the triangular laser pulse shape shown in FIG. 8 is longer than that of the rectangular laser pulse shape. In the example shown in FIG. 8, for instance, the laser pulse width $T_{is}$ of the triangular laser pulse shape is twice as long as the laser pulse width T of the rectangular laser pulse shape.

As has been stated above, the reduction in transmittance due to two-photon absorption and the reduction in resolution due to a compaction are in inverse proportion to the laser pulse width $T_{is}$, which is given by Eq. (1), when the laser pulse energy is assumed to be constant. Therefore, it is demanded that the laser pulse width $T_{is}$ be stretched (i.e. a longer pulse width should be achieved).

Narrow-linewidth ArF excimer laser apparatus for lithography commercially available at present in general perform an oscillating operation at a repetition frequency (hereinafter referred to as "repetition rate") of 1 kHz and provide a laser output of 5 W. In order to avoid damage to the optical system mounted in the semiconductor exposure system, it is necessary that the laser pulse width $T_{is}$ be 30 ns or longer.

As has been stated above, it is demanded in ArF excimer laser apparatus that the laser pulse width $T_{is}$ be stretched to achieve a longer pulse width in order to reduce the damage to the optical system mounted in the exposure system. The achievement of a longer pulse width is also demanded for KrF excimer laser apparatus and fluorine laser apparatus from the following points of view.

In a projection exposure system, an image of a mask provided with a circuit pattern or the like is projected through a projection lens onto a work, e.g. a wafer, coated with a photoresist. The resolution R of the projected image and the depth of focus DOF are expressed by $$R = k_1 \cdot \lambda / NA \quad (6)$$

$$DOF = k_2 \cdot \lambda / (NA)^2 \quad (7)$$

where $k_1$ and $k_2$ are coefficients reflecting the characteristics of the resist and so forth; $\lambda$ is the wavelength of exposure light emitted from a light source for lithography; and NA is a numerical aperture.

To improve the resolution R, the wavelength of exposure light is reduced, and the NA is increased, as will be clear from Eq. (6). However, the depth of focus DOF decreases correspondingly, as shown by Eq. (7). Consequently, the influence of chromatic aberration increases. Therefore, it is necessary to further narrow the spectral linewidth of exposure light. In other words, it is demanded that the spectral linewidth of the laser beam emitted from the gas laser apparatus for lithography be further narrowed.

It is stated in Proc. SPIE Vol. 3679. (1999) 1030-1037 that according as the laser pulse width increases, the spectral linewidth of the laser beam narrows. This was actually proved by an experiment conducted by the present inventors. In other words, it is demanded in order to improve the resolution R that the spectral linewidth of the laser beam be further narrowed. To meet this demand, it is necessary to stretch the pulse width of the laser beam.

Thus, it has become essential to stretch the laser pulse width $T_{is}$ in order to avoid damage to the optical system in the exposure system and to improve the resolution. It is known that the laser pulse width $T_{is}$ depends upon the concentration of fluorine gas in the laser gas sealed in the laser chamber [see the above-mentioned Proc. SPIE Vol. 3679. (1999) 1030-1037]. By adjusting the fluorine gas concentration, the laser pulse width $T_{is}$ can be stretched to achieve a longer pulse width, i.e. $T_{is} \geq 30$ ns.

In Japanese Patent Application No. Hei 11-261628, the present inventors propose a method of forming a laser pulse of $T_{is} \geq 30$ ns by performing a laser oscillating operation by the first half-cycle of the discharge oscillating current waveform of one pulse in which the polarity is reversed, together with at least one half-cycle subsequent to the first half-cycle.

There have been demands that KrF excimer laser apparatus presently used as light sources for semiconductor lithography, and ArF excimer laser apparatus or fluorine laser apparatus, which are promising as next-generation light sources for semiconductor lithography, should achieve a higher resolution and a higher throughput and reduce the damage to quartz.

However, the technique of achieving a longer pulse width for obtaining a higher resolution and reducing the damage effectively and the technique of achieving a higher repetition rate to obtain a higher throughput are contrary to each other from the viewpoint of the capability of sustaining stable electric discharge. Accordingly, it has been deemed difficult for the two techniques to be compatible with each other. It is reported that it is difficult to achieve a longer pulse width in gas laser apparatus using fluorine, in particular [for example, see Mitsuo Maeda "Excimer Laser", p. 163, and IEEE JOURNAL OF SELECTED TOPICS IN QUANTUM ELECTRONICS VOL. 5, No. 6 (1999), p. 1515].

SUMMARY OF THE INVENTION

The present invention was made in view of the above-described circumstances. An object of the present invention is to provide an ArF excimer laser apparatus for lithography capable of stretching the laser pulse width even when the repetition rate exceeds 4 kHz and also provide a KrF excimer laser apparatus and fluorine laser apparatus for lithography capable of stretching the laser pulse width even when the repetition rate exceeds 2 kHz.

To attain the above-described object, the present invention provides ArF and KrF excimer laser apparatus and fluorine laser apparatus for lithography, each having a pair of laser discharge electrodes connected to output terminals of a magnetic pulse compression circuit and disposed in a laser chamber. A peaking capacitor is connected in parallel to the pair of laser discharge electrodes.

The capacities of capacitors and the inductances of circuit loops in the laser apparatus are denoted as follows: The capacity of a capacitor in the final stage of the magnetic pulse compression circuit is denoted by Cn (n is the number of stages of the magnetic pulse compression circuit); the capacity of the peaking capacitor is denoted by Cp; the inductance of a first circuit loop formed by the capacitor in the final stage and the laser discharge electrodes is denoted by Ln; and the inductance of a second circuit loop formed by the peaking capacitor and the laser discharge electrodes is denoted by Lp.

The relationship between the period Tn of the waveform of an oscillating current flowing in the first circuit loop, i.e. $Tn = 2\pi \sqrt{(Ln \times Cn)}$, and the period Tp of the waveform of an oscillating current flowing in the second circuit loop, i.e. $Tp = 2\pi \sqrt{(Lp \times Cp)}$, satisfies the following condition:

$$5Tp \leq Tn$$

In addition, the period Tn satisfies the following condition:

$$Tn < 250 \text{ ns}$$

With the above-described arrangement, a laser oscillating operation is performed by at least 2.5 cycles of the oscillating current flowing between the laser discharge electrodes.

In addition, the present invention provides ArF and KrF excimer laser apparatus and fluorine laser apparatus for lithography, each having a pair of laser discharge electrodes connected to output terminals of a magnetic pulse compression circuit and disposed in a laser chamber. A peaking capacitor is connected in parallel to the pair of laser discharge electrodes.

The capacities of capacitors and the inductances of circuit loops in the laser apparatus are denoted as follows: The capacity of a capacitor in the final stage of the magnetic pulse compression circuit is denoted by Cn (n is the number of stages of the magnetic pulse compression circuit); the capacity of the peaking capacitor is denoted by Cp; the inductance of a first circuit loop formed by the capacitor in the final stage and the laser discharge electrodes is denoted by Ln; and the inductance of a second circuit loop formed by the peaking capacitor and the laser discharge electrodes is denoted by Lp.

The relationship between the period Tn of the waveform of an oscillating current flowing in the first circuit loop, i.e. $Tn = 2\pi \sqrt{(Ln \times Cn)}$, and the period Tp of the waveform of an oscillating current flowing in the second circuit loop, i.e. $Tp = 2\pi \sqrt{(Lp \times Cp)}$, satisfies the following condition:

$$3Tp \leq Tn < 5Tp$$

In addition, the period Tn satisfies the following condition:

$T_n < 250$ ns

With the above-described arrangement, a laser oscillating operation is performed by at least 1.5 cycles of the oscillating current flowing between the laser discharge electrodes.

In the above-described laser apparatus, it is desirable that the laser discharge electrodes should have a length of 600 to 750 mm and a gap of 15 to 18 mm, and the overall gas pressure in the laser chamber should be 2 to 4 atmospheric pressure, and the fluorine concentration in the laser chamber should be not more than 0.15%, and further the capacity Cn of the capacitor in the final stage should be not less than 8 nF.

Further, it is desirable that a capacitor for preionization should be connected in parallel to the peaking capacitor and in series to corona preionization electrodes, and the combined capacity Cc of the electrostatic capacity of the corona preionization electrodes and the capacity of the capacitor for preionization should be not more than 5% of the capacity Cp of the peaking capacitor.

Further, it is desirable that the output mirror of the optical resonator should have a reflectance of not less than 40%.

Thus, according to the present invention, the primary current for injecting energy into the discharge electrodes from the magnetic pulse compression circuit through the peaking capacitor and the secondary current for injecting energy into the discharge electrodes from the peaking capacitor-charging capacitor in the final stage of the magnetic pulse compression circuit are superimposed on one another. The oscillation period of the secondary current is set to at least 5 times, or not less than 3 times and less than 5 times, as long as the oscillation period of the primary current, and the oscillation period of the secondary current is set to less than 250 ns, whereby a laser oscillating operation for each pulse is performed by the first half-cycle of the waveform of the primary discharge oscillating current, on which the secondary current is superimposed, together with at least four half-cycles or two half-cycles subsequent to the first half-cycle. Accordingly, it is possible to realize a high-repetition rate and narrow-linewidth ArF excimer laser apparatus for semiconductor lithography capable of operating stably with a stretched pulse width even when the repetition rate is 4 kHz or higher. In addition, it is possible to realize high-repetition rate and narrow-linewidth KrF excimer laser apparatus and fluorine laser apparatus for semiconductor lithography capable of operating stably with a stretched pulse width even when the repetition rate is 2 kHz or higher.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

The principle of the present invention, together with an embodiment thereof, will be described below with reference to the accompanying drawings.

In compliance with the above-described demands, the present inventors have developed a long pulse ArF excimer laser apparatus for lithography capable of operating stably with a laser pulse width $T_{is} \geq 50$ ns even when the repetition rate is 4 kHz or higher by forming a pulse width stretching circuit corresponding to a high repetition rate oscillating operation in the laser discharge circuit.

The principle of the present invention is as follows. As specific operations thereof, the pulse width stretching circuit accelerates the rise of the primary current flowing across the discharge space from a peaking capacitor connected in parallel to the pair of laser discharge electrodes disposed in the laser chamber. Moreover, the circuit increases the peak value of the primary current and shortens the period of the primary current, thereby allowing stable electric discharge to be readily sustained. In addition, the circuit is arranged so that electric charge remaining in the peaking capacitor-charging capacitor in the magnetic pulse compression circuit (i.e. the electric charge left untransferred to the peaking capacitor until an electric discharge starts) also flows during the period of time between the first cycle and the first half of the third cycle of the primary current flowing across the discharge space from the peaking capacitor, whereby a laser oscillating operation is performed by the first half-cycle of the discharge oscillating current waveform, together with at least four half-cycles subsequent to the first half-cycle, i.e. a total of five half-cycles.

Figure 1:
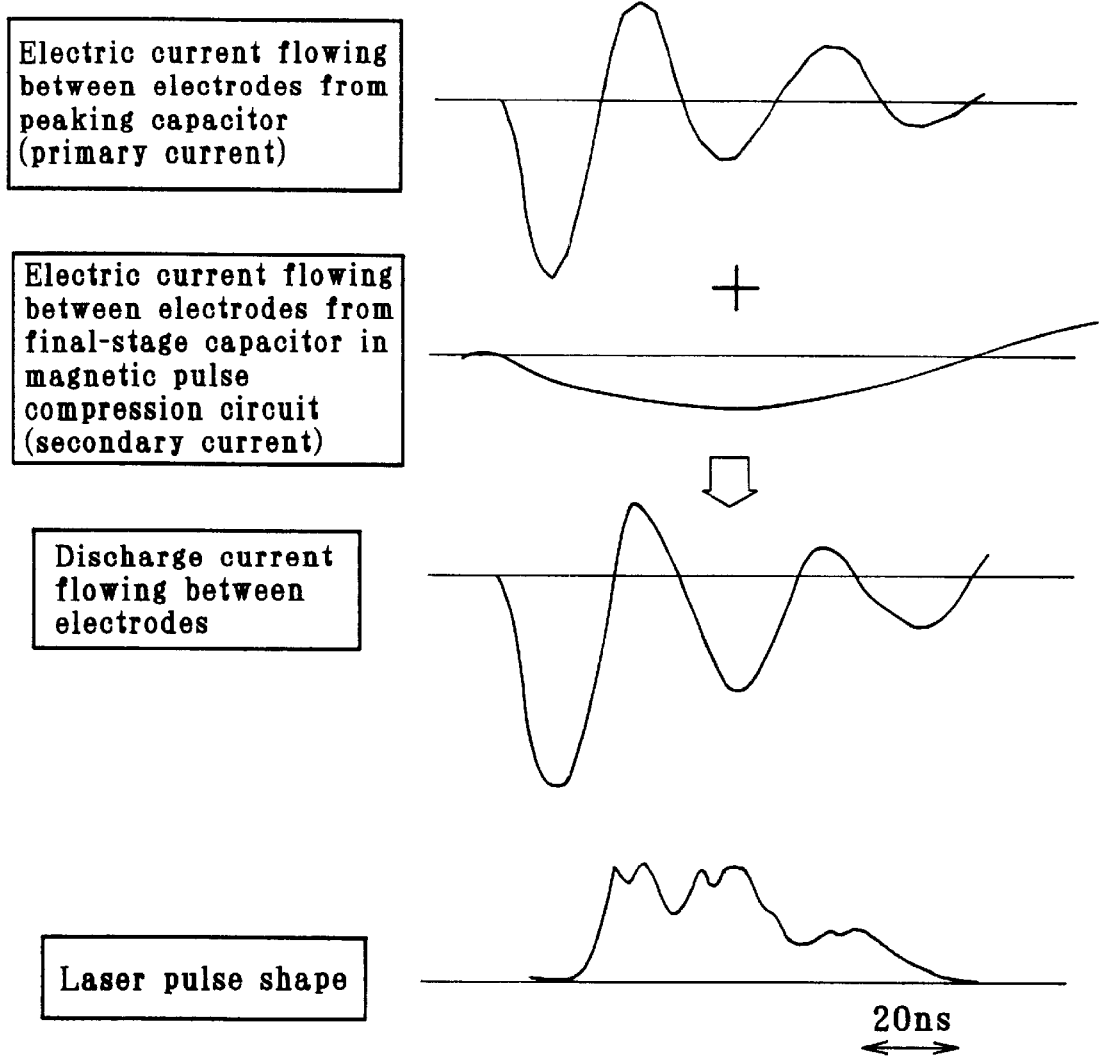
FIG. 1 is a waveform chart for describing the principle of a laser apparatus for lithography according to the present invention.

FIG. 1 is a conceptual view showing the above-described operation. Circuit constants are determined so that the primary current flowing from the peaking capacitor rises rapidly, and the peak value thereof is increased, and further the period thereof is shortened (a specific circuit configuration and specific circuit constants will be described later), thereby allowing stable electric discharge to be readily sustained.

Meanwhile, circuit constants are determined so that electric charge remains in the peaking capacitor-charging capacitor (capacitor in the final stage) in the magnetic pulse compression circuit when an electric discharge starts (a specific circuit configuration and specific circuit constants will be described later). The period of the secondary current during which the residual electric charge flows across the discharge space is set to at least 5 times as long as the period of the primary current.

Thus, the electric current flowing between the discharge electrodes is a combination of the primary current and the secondary current, which are superimposed on one another. As shown in FIG. 1, a laser oscillating operation for each pulse is performed by the first half-cycle of the oscillating current waveform, together with at least four half-cycles subsequent to the first half-cycle.

Let us give some supplementary explanation. The first, third and fifth half-cycles of the oscillating current composed of the superimposed primary and secondary currents (i.e. the discharge current flowing between the discharge electrodes) shown in FIG. 1 are of the same polarity, and the intensity is increased by the superimposition of the primary current and the secondary current. Energy injected into the discharge space during this period of time increases in comparison to the conventional apparatus lacking the secondary current. The oscillation energy also increases. Conversely, in the second and fourth half-cycles of the oscillating current, the electric current value decreases. Therefore, the injected energy decreases. However, even during the second half-cycle, the electric discharge is sustained in the discharge space continuously from the first half-cycle, although the polarity is inverted, so that energy is injected efficiently. Accordingly, the laser oscillating operation can be sustained from the first half-cycle through the second, third and fourth half-cycles to the fifth half-cycle.

Thus, the primary current for injecting energy into the discharge electrodes from the magnetic pulse compression circuit through the peaking capacitor and the secondary current for injecting energy into the discharge electrodes from the peaking capacitor-charging capacitor in the magnetic pulse compression circuit are superimposed on one another. Moreover, the oscillation period of the secondary current is set to at least 5 times as long as the oscillation period of the primary current so that a laser oscillating operation for each pulse is performed by the first half-cycle of the primary current waveform, on which the secondary current is superimposed, together with at least four half-cycles subsequent to the first half-cycle. Consequently, it becomes possible to achieve a longer pulse width, i.e. $T_{is} \geq 50$ ns. It is also possible to narrow down the linewidth below 0.45 pm (half-width). Thus, resolution is improved. In addition, because the peak light intensity is reduced by the achievement of a longer pulse width, the damage to quartz can be reduced.

A specific example of a laser apparatus (usable as any of ArF, KrF and fluorine laser apparatus) for lithography according to the present invention and a specific example of an exciting circuit thereof will be shown below.

Figure 2:
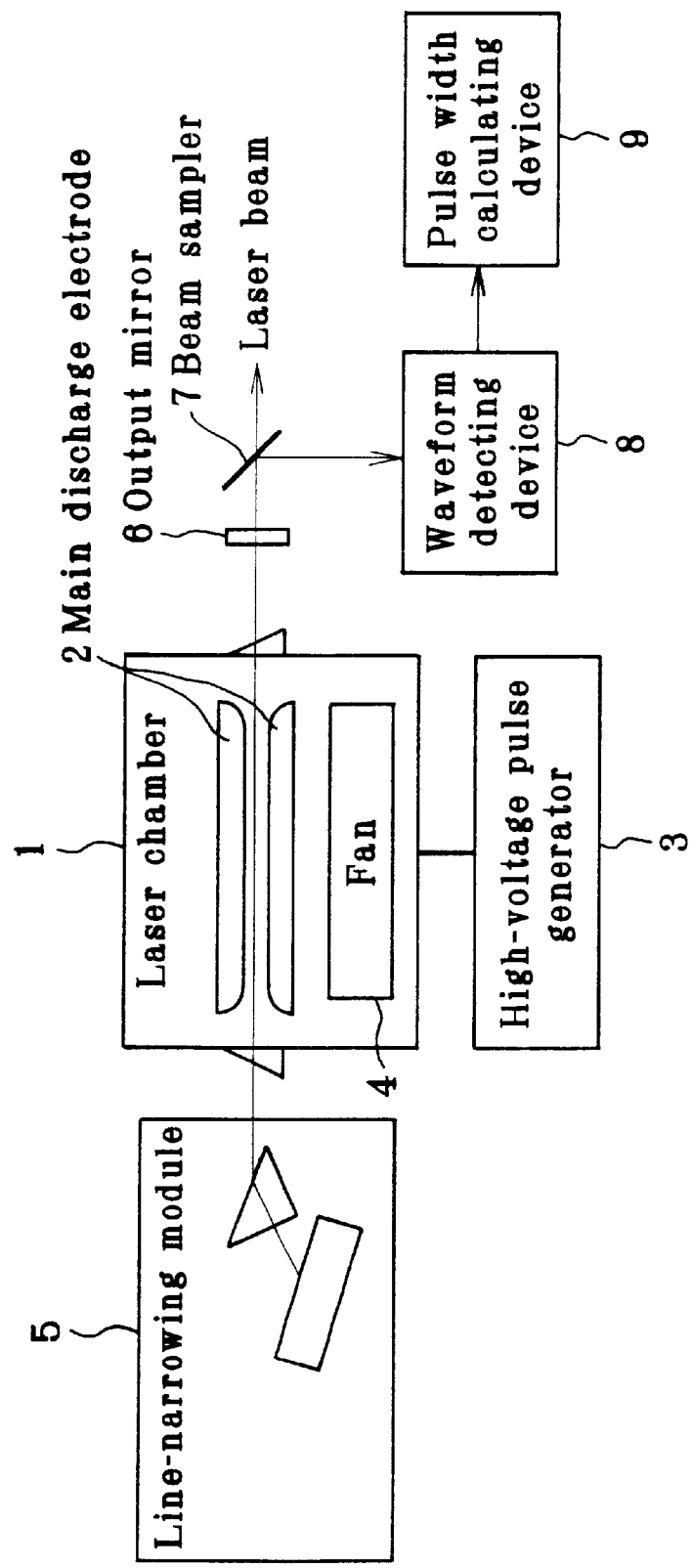
FIG. 2 is a diagram showing a structural example of a laser apparatus for lithography to which the present invention is applied.

FIG. 2 is a diagram showing a structural example of a laser apparatus for lithography according to the present invention. In the figure, a laser chamber 1 has windows provided at both ends thereof. The laser chamber 1 has a laser gas sealed therein. The laser gas is a mixed gas consisting essentially of fluorine gas, either or neither of argon gas and krypton gas, and a buffer gas (e.g. neon gas).

A pair of main discharge electrodes 2 are provided in the laser chamber 1 to face each other across a predetermined gap. A high-voltage pulse generator 3 applies a high-voltage pulse between the main discharge electrodes 2 to generate an electric discharge therebetween, thereby exciting the laser gas serving as a laser medium.

The laser gas is forced to circulate in the laser chamber 1 by rotation of a fan 4 provided in the laser chamber 1.

By the laser gas circulation, the laser gas between the main discharge electrodes 2 is replaced with a new gas after the generation of an electric discharge before the generation of the subsequent electric discharge. Therefore, the subsequent electric discharge is allowed to be a stable discharge.

The present inventors improved the laser gas circulating structure of the laser chamber 1, the discharge electrodes and so forth and newly developed a high-voltage pulse generator to realize a repetition rate of 4 kHz or higher.

A line-narrowing module 5 is provided at one end of the laser chamber 1. The line-narrowing module 5 has a line-narrowing optical system for narrowing the spectral linewidth of the laser beam. The line-narrowing module 5 comprises, for example, a beam diameter-expanding optical system, which is formed from one or more prisms, and a Littrow mounting reflection type diffraction grating. An output mirror 6 is provided at the other end of the laser chamber 1. The output mirror 6 and the line-narrowing optical system, which is installed in the line-narrowing module 5, form a laser resonator.

A part of the laser beam emitted from the output mirror 6 is taken out by a beam sampler 7 and led to a waveform detecting device 8 for detecting the temporal waveform of the laser beam. The waveform detecting device 8 has, for example, a photodiode or a photomultiplier tube as a photoelectric conversion device. Waveform data obtained by the waveform detecting device 8 is sent to a pulse width calculating device 9. The pulse width calculating device calculates the laser pulse width $T_{is}$ according to the above-described Eq. (1) on the basis of the received pulse width data.

Figure 3:
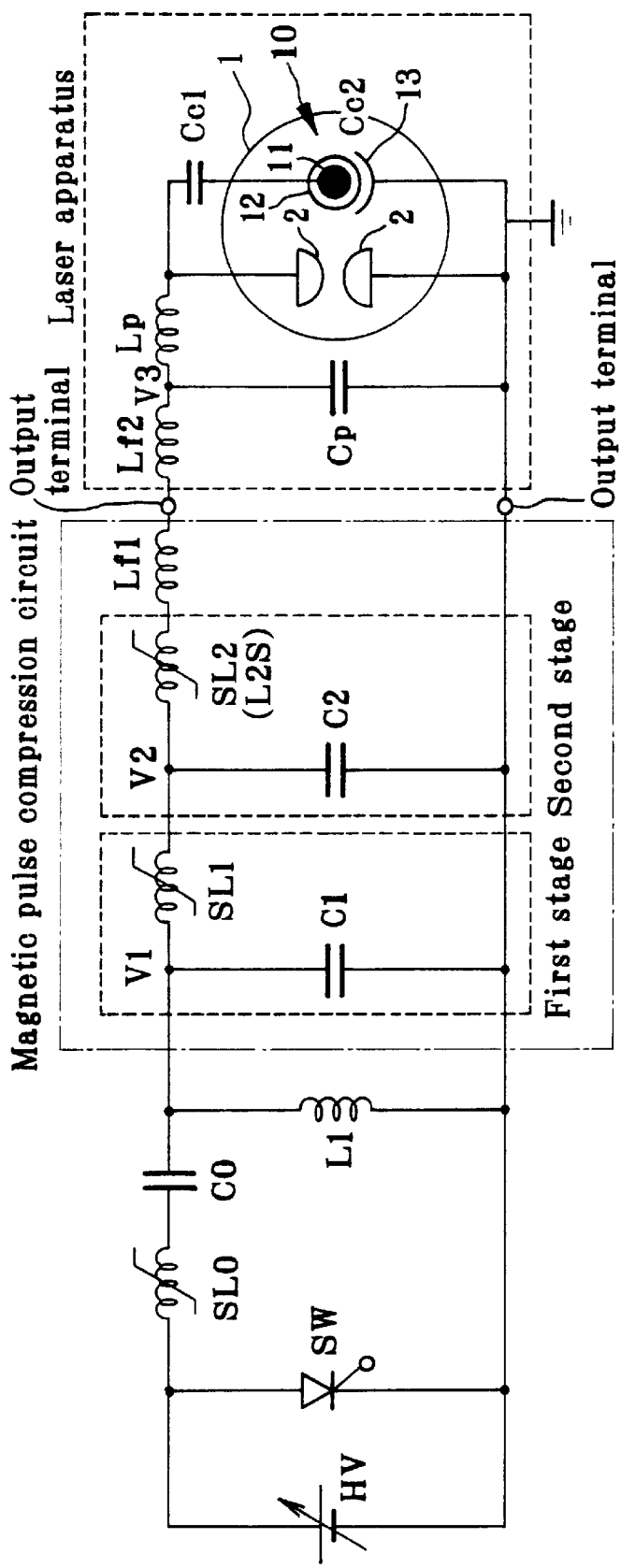
FIG. 3 is a circuit diagram showing an example of an exciting circuit according to the present invention.

An exciting circuit arranged as shown in FIG. 3 applies a main discharge voltage between the main discharge electrodes 2 of the above-described laser apparatus for lithography and also applies a predischarge voltage between electrodes 11 and 13 of a corona preionization unit 10 through a capacitor Cc1 for preionization. It should be noted that the corona preionization unit 10 in this example is arranged as follows. For example, the first electrode 11 is formed from a circular column-shaped electrode inserted into a tube 12 made of a dielectric material, e.g. high-purity alumina ceramics. The second electrode 13 is formed from a rectangular plate-shaped electrode. The plate-shaped member, which constitutes the second electrode 13, is bent in the vicinity of a straight edge thereof. The edge of the second electrode 13 is placed parallel to and in line contact with the outer surface of the dielectric tube 12, which constitutes the first electrode 11. The position at which the edge of the second electrode 13 contacts the outer surface of the dielectric tube 12 is set at a position from which the laser excitation space between the main discharge electrodes 2 is visible and in close proximity to one main discharge electrode 2. The corona preionization unit 10 has an electrostatic capacity Cc2.

The exciting circuit shown in FIG. 3 is a two-stage magnetic pulse compression circuit using three magnetic switches SL0, SL1 and SL2 formed from saturable reactors, respectively. The magnetic switch SL0 protects a solid-state switch SW. The first magnetic switch SL1 and the second magnetic switch SL2 constitute a two-stage magnetic pulse compression circuit.

The arrangement and operation of the circuit will be described below with reference to FIG. 3. First, the voltage of a high-voltage power supply HV is adjusted to a predetermined value, and a main capacitor C0 is charged through the magnetic switch SL0 and an inductance L1. At this time, the solid-state switch SW is OFF. Upon completion of the charging of the main capacitor C0, the solid-state switch SW turns ON. At this time, the voltage across the solid-state switch SW shifts so as to be applied across the magnetic switch SL0, thereby protecting the solid-state switch SW. When the time integration value of the charging voltage V0 across the main capacitor C0, which is applied across the magnetic switch SL0, reaches a critical value determined by the characteristics of the magnetic switch SL0, the magnetic switch SL0 is saturated to turn ON. Consequently, an electric current flows through a loop formed by the main capacitor C0, the magnetic switch SL0, the solid-state switch SW and a capacitor C1. As a result, the electric charge stored in the main capacitor C0 is transferred to and stored in the capacitor C1.

Thereafter, when the time integration value of the voltage V1 across the capacitor C1 reaches a critical value determined by the characteristics of the magnetic switch SL1, the magnetic switch SL1 is saturated to turn ON. Consequently, an electric current flows through a loop formed by the capacitor C1, a capacitor C2 and the magnetic switch SL2. As a result, the electric charge stored in the capacitor C1 is transferred to and stored in the capacitor C2.

Thereafter, when the time integration value of the voltage V2 across the capacitor C2 reaches a critical value determined by the characteristics of the magnetic switch SL2, the magnetic switch SL2 is saturated to turn ON. Consequently, an electric current flows through a loop formed by the capacitor C2, a peaking capacitor Cp and the magnetic switch SL2. As a result, the electric charge stored in the capacitor C2 is transferred to and stored in the peaking capacitor Cp.

As will be clear from the description given in connection with FIG. 3, a corona discharge for preionization occurs at the outer peripheral surface of the dielectric tube 12, starting from the position at which the second electrode 13 contacts the dielectric tube 12. More specifically, as the charging of the peaking capacitor Cp, which is shown in FIG. 3, proceeds, the voltage V3 across the peaking capacitor Cp increases. When the voltage V3 reaches a predetermined value, a corona discharge occurs at the surface of the dielectric tube 12 of the corona preionization unit. The corona discharge causes ultraviolet radiation to be generated at the surface of the dielectric tube 12. The ultraviolet radiation preionizes the laser gas flowing between the main discharge electrodes 2 as a laser medium.

As the charging of the peaking capacitor Cp further proceeds, the voltage V3 across the peaking capacitor Cp increases. When the voltage V3 reaches a certain value (breakdown voltage) Vb, an electric breakdown occurs in the laser gas between the main discharge electrodes 2, and thus a main discharge starts. The laser medium is excited by the main discharge, and a laser beam is generated.

Thereafter, the voltage across the peaking capacitor Cp lowers rapidly owing to the main discharge, and eventually returns to the state before the start of charging.

The above-described discharging operation is repeated by the switching operation of the solid-state switch SW, whereby pulsed laser oscillation is performed at a predetermined repetition rate.

Thus, a combination of the magnetic switch SL1 and the capacitor C1 forms a capacitive transfer circuit constituting a first stage, and a combination of the magnetic switch SL2 and the capacitor C2 forms a capacitive transfer circuit constituting a second stage. By setting the inductance of each capacitive transfer circuit so that the inductance becomes smaller as the ordinal number of stages increases, a pulse compression operation is carried out such that the pulse width of an electric current pulse flowing through each stage narrows successively. Consequently, a strong discharge of short pulse is realized between the main discharge electrodes 2.

Incidentally, when a laser apparatus is used as a light source for semiconductor lithography, a discharge volume necessary for lithography is naturally determined by the laser output energy necessary for lithography. In view of the discharge volume, the gap between the main discharge electrodes 2 needs to be about 15 to 18 mm, and the length thereof needs to be about 600 to 750 mm.

The laser output energy is in general determined by the capacity of the peaking capacitor Cp (the input energy obtained by electric discharge is $\frac{1}{2} \times Cp \cdot Vb^2$). The larger the capacity of the peaking capacitor Cp, the greater the laser output energy. However, the capacity of the peaking capacitor Cp has to be reduced in order to shorten the period of the electric current flowing between the main discharge electrodes 2. Moreover, in order to allow the electric charge to remain in the capacitor C2 even when the electric current from the peaking capacitor Cp flows between the main discharge electrodes 2, as has been described with regard to FIG. 1, the capacity of the peaking capacitor Cp cannot be made very large.

According to the present invention, it is necessary to determine circuit constants so that the electric current flowing between the main discharge electrodes 2 from the peaking capacitor Cp rises rapidly (i.e. the period thereof is shortened), and the peak value of the electric current is increased, as has been stated above. The voltage (breakdown voltage) Vb at which an electric discharge starts between the main discharge electrodes 2 depends on the rise of the voltage applied between the main discharge electrodes 2. When the rise time is short, the discharge starting voltage Vb becomes high (occurrence of an overvoltage). Therefore, in order to increase the peak value of the electric current, it is necessary to make the applied voltage increase sharply. In this regard, let us assume that, as shown in FIG. 3, L2s is the residual inductance in the magnetic switch SL2, and Lf1 is the stray inductance due to the connection at the output terminal of the magnetic pulse compression circuit, Lf1 being the stray inductance on the side of the output terminal closer to the magnetic pulse compression circuit. Further, Lf2 is assumed to be the laser apparatus-side stray inductance due to the above-described connection at the upstream side of the peaking capacitor Cp. In order to make the applied voltage increase sharply, as stated above, it is necessary to allow the peaking capacitor Cp to be charged rapidly from the capacitor C2 by reducing the inductance L2', which is the sum of L2s, Lf1 and Lf2 (i.e. L2'=L2s+Lf1+Lf2).

To shorten the period of the electric current flowing between the main discharge electrodes 2 from the peaking capacitor Cp to thereby allow stable electric discharge to be readily sustained, the circuit is arranged as follows. That is, parameters that determine the period of the oscillating current flowing between the main discharge electrodes 2 from the peaking capacitor Cp are the capacity Cp and stray inductance Lp in a loop (discharge current circuit) formed by the peaking capacitor Cp and the main discharge electrodes 2 in the exciting circuit shown in FIG. 3. The root of the product of the capacity Cp and the stray inductance Lp is proportional to the period of the oscillating current flowing between the main discharge electrodes 2 from the peaking capacitor Cp. Accordingly, to shorten the period of the oscillating current, the stray inductance Lp in the discharge current circuit should be minimized. However, because the size of the stray inductance Lp is determined by the sectional area of the laser cavity, the stray inductance Lp cannot actually be reduced to a value smaller than about 3 nH.

In addition, it is necessary to reduce the electric resistance of the laser gas in order to increase the peak value of the electric current in the second and later half-cycles of the oscillating current flowing between the main discharge electrodes 2 so that laser oscillation is continued even during the second and later half-cycles. The electric resistance of the mixed gas becomes lower as the partial pressure of fluorine in the laser gas decreases. Therefore, it is desirable that the fluorine partial pressure with respect to the overall pressure of the laser gas be not more than 0.15%. It should be noted that when the pressure of the laser gas is 2 atmospheric pressure or less, the amount of energy that can be injected becomes too small to obtain the output energy required for the exposure system. Conversely, when the laser gas pressure is higher than 4 atmospheric pressure, the electric resistance becomes excessively large. Consequently, it becomes difficult to allow laser oscillation to take place continuously during the second and later half-cycles of the oscillating current.

On the basis of the above-described knowledge, an ArF excimer laser apparatus for lithography as shown in FIG. 2 was arranged as follows. The laser discharge electrode length was 700 mm, and the electrode gap was 16 mm. The pressure in the laser chamber 1 was 3 atmospheric pressure (about 300 kPa). The fluorine concentration was 0.09%, and the argon concentration was 3%. The buffer gas was neon. In addition, an exciting circuit comprising a two-stage magnetic pulse compression circuit as shown in FIG. 3 was arranged as follows. The repetition rate was 4 kHz. The magnetic switch SL2 and the structure of the electric discharge section were designed so as to have L2s, Lf1, Lf2, and Lp such that the period Tp of the primary current flowing between the discharge electrodes from the peaking capacitor Cp and the period T2 of the secondary current flowing between the discharge electrodes from the final-stage capacitor C2 are as follows:

$$Tp = 2\pi\sqrt{(Lp \times Cp)} = 2\pi\sqrt{(5nH \times 8nF)} = 40 \ ns$$

$$T2 = 2\pi\sqrt{\{(L2s + Lf1 + Lf2 + Lp) \times C2\}}$$

$$= \pi\sqrt{(100nH \times 12nF)} = 218 \ ns$$

In this way, the value of the peaking capacitor Cp and the value of the final-stage capacitor C2 were set.

Further, the capacity of the capacitor Cc1 for preionization was set at 0.4 nF, and the structure of the corona preionization unit 10 was designed so that its electrostatic capacity Cc2 was 0.2 nF. The reflectance of the output mirror 6 was 50%. It should be noted that the pressure in the laser chamber 1 is expressed in terms of the value of pressure when the gas temperature is 25° C.

Figure 4:
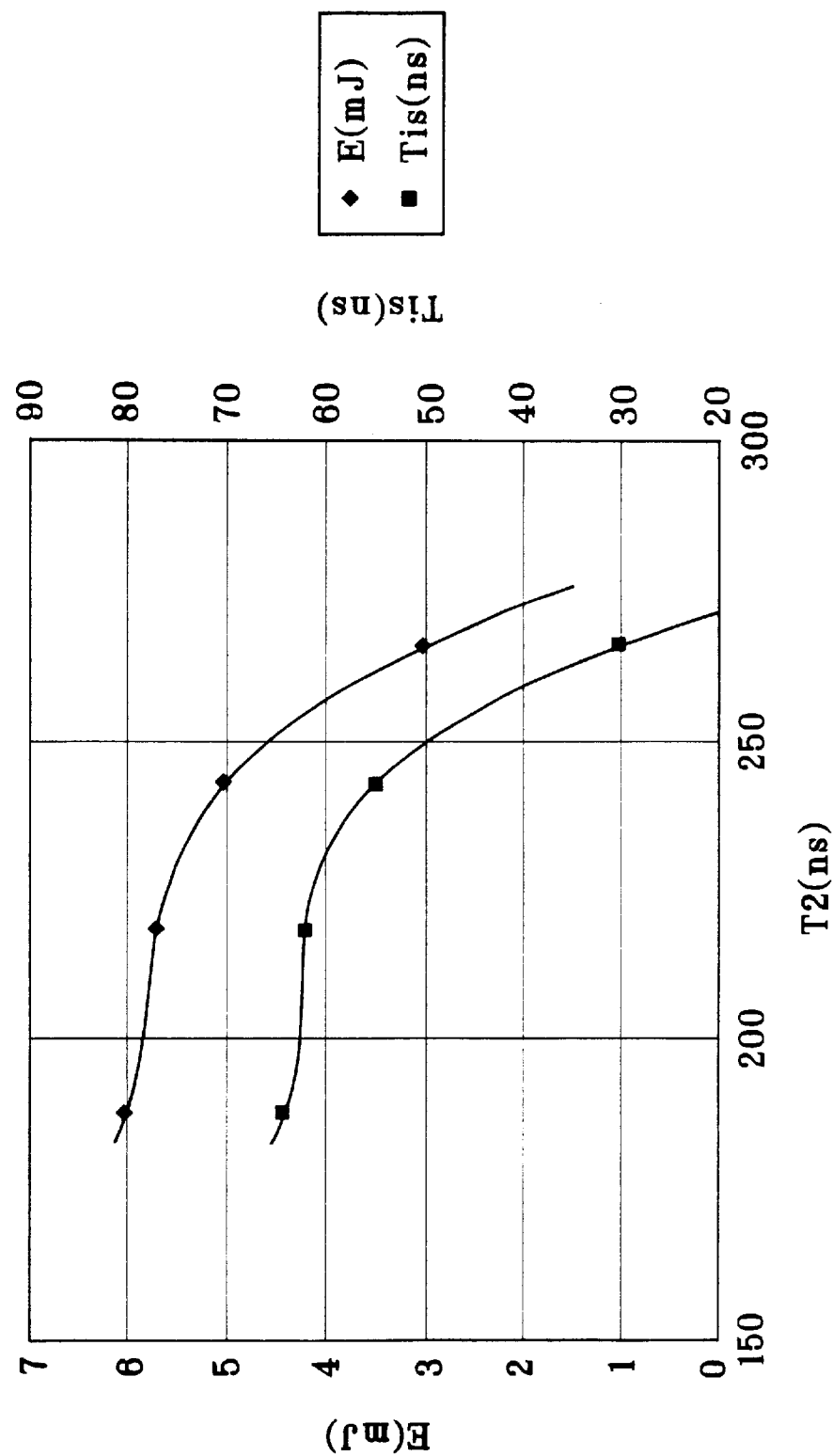
FIG. 4 is a diagram showing the results of an examination of the relationship between the laser output energy and the pulse width when the period of the secondary current flowing between discharge electrodes was varied.

It has been experimentally found that when the period T2 is 250 ns or more, the electric current flowing between the discharge electrodes from the final-stage capacitor C2 cannot effectively be used for laser oscillation. FIG. 4 shows the relationship between the laser output energy (E) and the pulse width ($T_{is}$) obtained when the period T2 was varied under the conditions that the repetition rate was 4 kHz and C2 was 12 nF, by way of example. The period T2 was varied by changing the residual inductance L2s of a magnetic pulse compression circuit formed by using magnetic switches SL2 having different residual inductances L2s. The reason why the electric current flowing between the discharge electrodes from the final-stage capacitor C2 cannot effectively be used for laser oscillation when the period T2 is 250 ns or more is considered as follows. There is a limit to the duration of uniform electric discharge that can provide gain for the laser oscillation, and as the time elapses, the uniform electric discharge shifts to concentrated electric discharge, thus losing the gain.

Figure 5:
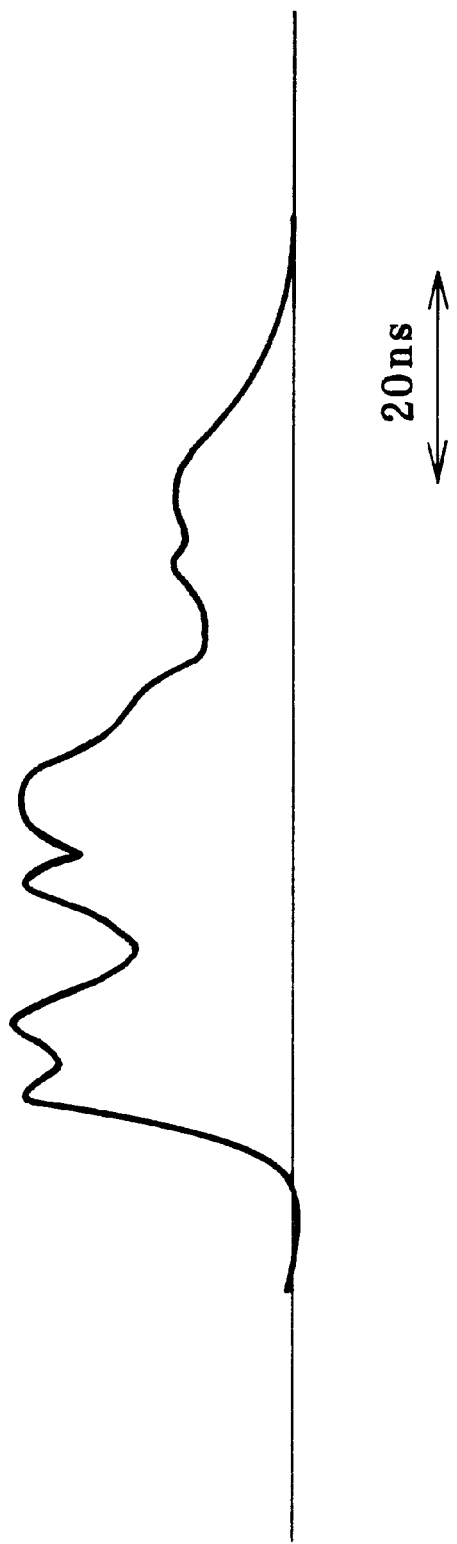
FIG. 5 is a diagram showing laser output waveform data obtained from an ArF excimer laser apparatus in a specific example.

FIG. 5 shows waveform data indicating a temporal laser pulse shape obtained by the waveform detecting device 8 under the above-described parameter settings. At this time, the value of the laser pulse width $T_{is}$ obtained by the pulse width calculating device 9 was 62 ns.

As will be clear from the above-described embodiment, it is possible to realize a long pulse ArF excimer laser apparatus for lithography capable of operating stably with a laser pulse width $T_{is} \geq 50$ ns even when the repetition rate is 4 kHz or higher by satisfying the following conditions:

(1) The period Tp of the primary current is reduced to 50 ns or shorter in order to accelerate the rise of the discharge current and to allow electric discharge to be sustained stably.

(2) The period T2 of the secondary current is reduced to 250 ns or shorter in order to raise the discharge starting voltage and to increase the peak value of the discharge current.

(3) The periods Tp and T2 are set so as to satisfy the condition of $5Tp \leq T2$ (5Tp shall not exceed T2; the laser oscillation efficiency increases as 5Tp becomes closer to being equal to T2), whereby during the second cycle plus the first half of the third cycle of the electric current flowing between the electrodes from the peaking capacitor Cp, an electric current due to the electric charge remaining in the final-stage capacitor C2 is allowed to flow in such a manner as to be superimposed on the electric current flowing from the peaking capacitor Cp.

Thus, the capability of sustaining stable electric discharge is enhanced by (1) and (2), and while the stable discharge is being sustained, energy is injected by (3). Accordingly, it is possible to perform an efficient laser oscillating operation with a longer pulse width.

Figure 6:
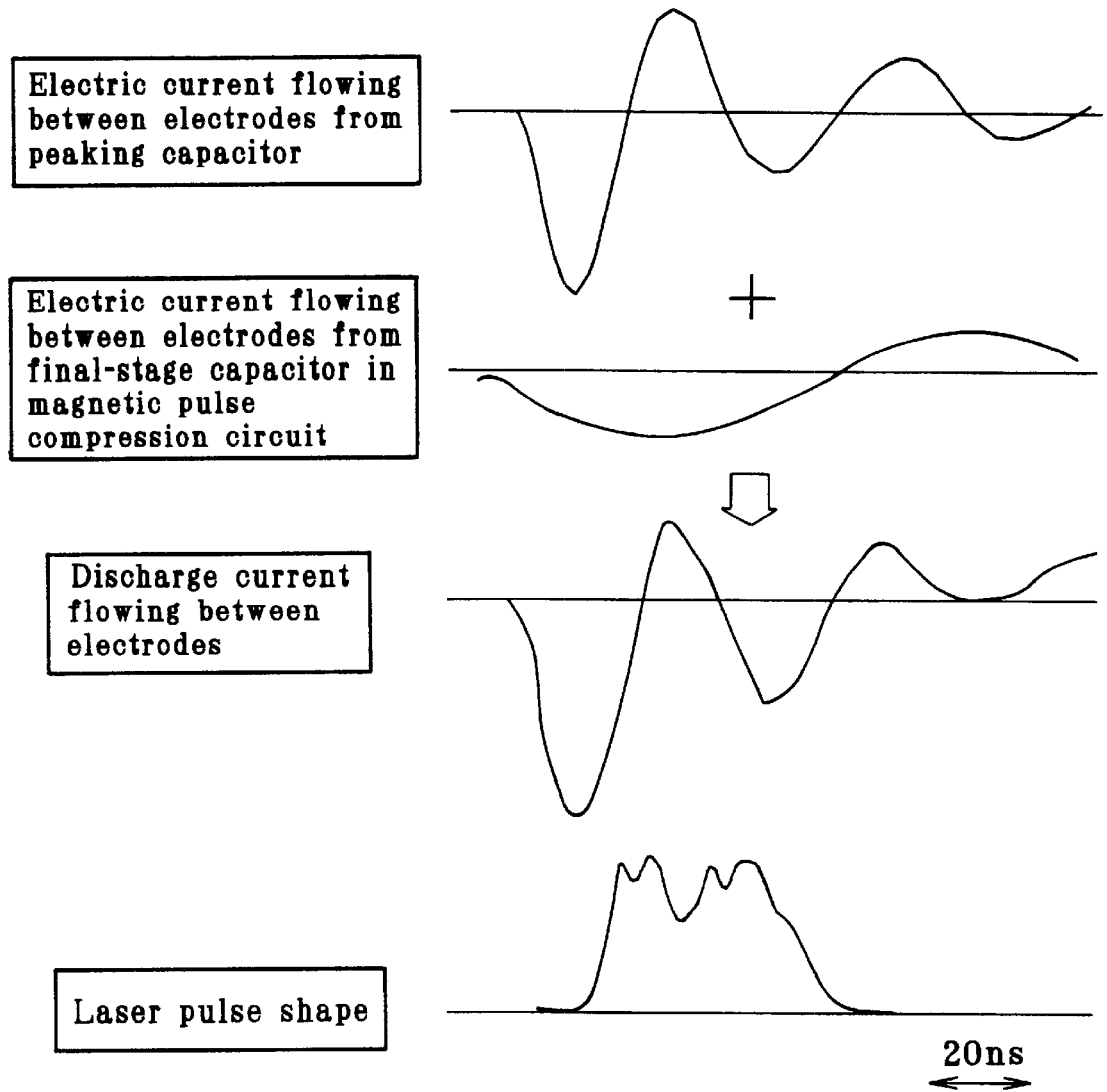
FIG. 6 is a waveform chart, which is similar to FIG. 1, for describing the principle of another laser apparatus for lithography according to the present invention.

It should be noted that even when it is difficult to realize a condition where $5Tp \leq T2$, if the condition of $3Tp \leq T2 < 5Tp$ is satisfied, a laser oscillating operation can be performed by at least 1.5 cycles of the oscillating current flowing between the discharge electrodes as shown in FIG. 6, which is a diagram similar to FIG. 1. That is, the laser apparatus is arranged so that the electric current flowing between the discharge electrodes is a composite electric current formed by superimposition of the primary current flowing from the peaking capacitor Cp and the secondary current flowing from the peaking capacitor-charging capacitor C2 in the magnetic pulse compression circuit, whereby, as shown in FIG. 6, a laser oscillating operation for each pulse is performed by the first half-cycle of the oscillating current waveform, together with at least two half-cycles subsequent to the first half-cycle. Accordingly, it is possible to perform a laser oscillating operation with a longer pulse width. In this case also, the laser oscillation efficiency increases as 3Tp becomes closer to being equal to T2.

It should be noted that the capacity of the final-stage capacitor C2 is determined by the laser output energy necessary for lithography. In actual practice, the capacity of the final-stage capacitor C2 needs to be at least 8 nF.

Figure 7:
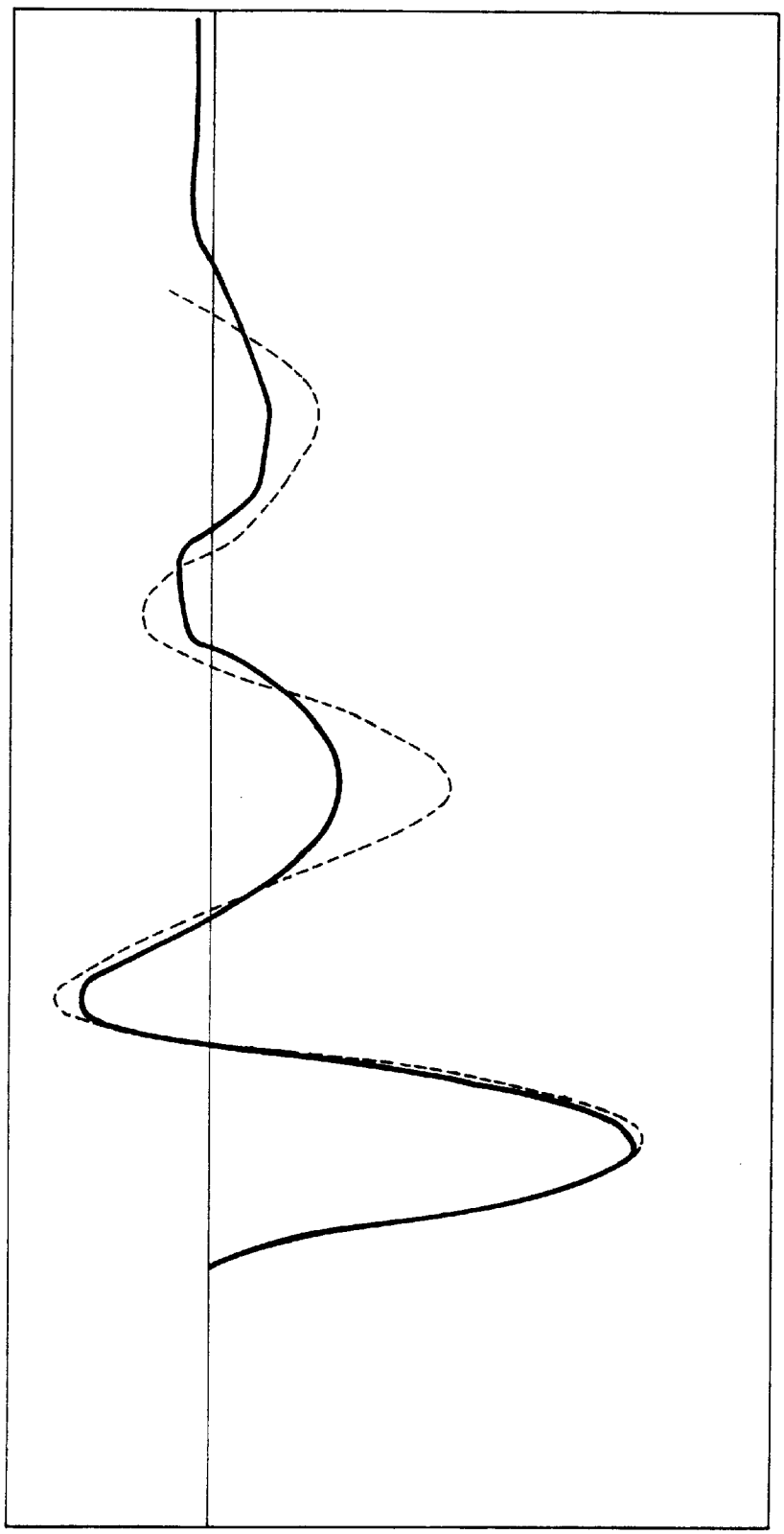
FIG. 7 is a diagram showing the way in which the electric current flowing between discharge electrodes is impeded in accordance with the combined capacity of a preionization circuit.
Figure 8:
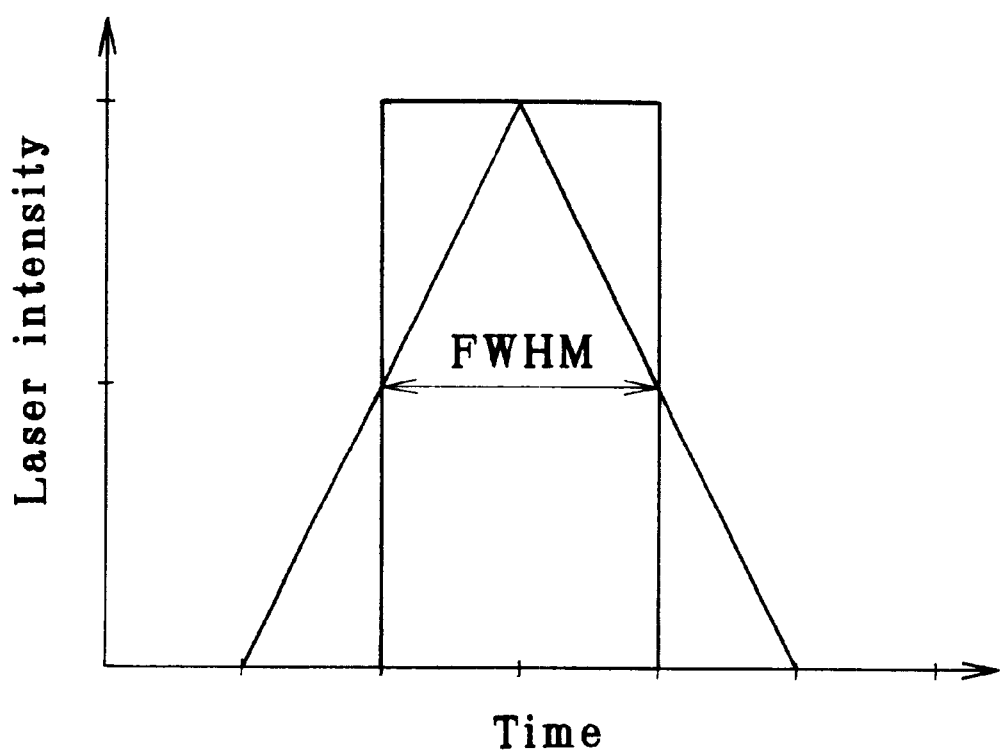
FIG. 8 is a diagram for describing the laser pulse width.

Incidentally, even when the above-described conditions (1) to (3) are satisfied, if the combined capacity Cc of the capacity of the capacitor Cc1 for preionization and the electrostatic capacity Cc2 of the corona preionization electrodes is larger than 5% of the capacity of the peaking capacitor Cp, the second and later cycles of the composite electric current flowing from the capacitors Cp and C2 are impeded owing to a phase shift occurring when an electric current due to the electric charge remaining in the preionization circuit flows in the discharge space. In FIG. 7, the broken line shows the waveform of an electric current flowing between the discharge electrodes under the above-described parameter settings, i.e. Cc1=0.4 nF, Cc2=0.2 nF, Cc=0.13 nF (Cc/Cp=0.13 nF/8 nF=1.6%). When the capacity of the capacitor Cc1 for preionization is increased to 2 nF and the electrostatic capacity Cc2 of the corona preionization electrodes is also increased to 1 nF so that the combined capacity Cc is 0.67 nF (Cc/Cp=0.67 nF/8 nF=8.4%), the current waveform becomes as shown by the solid line in FIG. 7. Thus, it will be understood that the second and later cycles of the composite electric current flowing from the capacitors Cp and C2 are impeded to a considerable extent. Therefore, it is preferable that the capacity Cc of the preionization circuit be set at the minimum value required for the electric discharge for preionization. Experimental results reveal that the capacity Cc of the preionization circuit is desirably not more than 5% of the capacity of the peaking capacitor Cp.

Incidentally, with a waveform having a stretched pulse width, i.e. $T_{is}$ >50 ns, the number of round trips (i.e. the number of times at which the laser beam reciprocates in the optical resonator) increases. Accordingly, if the reflectance of the output mirror 6 of the optical resonator is raised to 40% or more, the proportion of the second and later round trips increases. Consequently, the laser output increases, and the stability of the laser waveform is improved. The energy stability between the pulses of the emitted laser beam is also improved. In the above-described embodiment, an output mirror having a reflectance of 50% was used.

Thus, we have succeeded in realizing a high-repetition rate and narrow-linewidth ArF excimer laser apparatus providing a repetition rate of 4 kHz or more and a laser pulse width $T_{is}$ of 50 ns or more by the technique of newly devising a pulse width stretching discharge circuit (pulse shaping circuit), which is a novel technique according to the present invention entirely different from the conventional technique whereby the fluorine concentration in the laser chamber is adjusted.

Although the present invention has been described above with regard mainly to the ArF excimer laser apparatus, the present invention is also applicable to KrF excimer laser apparatus using neon as a diluent gas and to fluorine laser apparatus because the change in the gas impedance is not large in comparison to the circuit constants.

Although the ArF and KrF excimer laser apparatus and fluorine laser apparatus for lithography (i.e. gas laser apparatus emitting ultraviolet radiation) according to the present invention have been described above on the basis of the principle and embodiments thereof, it should be noted that the present invention is not limited to the foregoing embodiments but can be modified in a variety of ways.

As will be clear from the foregoing description, the laser apparatus for lithography according to the present invention is arranged so that the primary current for injecting energy into the discharge electrodes from the magnetic pulse compression circuit through the peaking capacitor and the secondary current for injecting energy into the discharge electrodes from the peaking capacitor-charging capacitor in the final stage of the magnetic pulse compression circuit are superimposed on one another. The oscillation period of the secondary current is set to at least 5 times, or not less than 3 times and less than 5 times, as long as the oscillation period of the primary current, and the oscillation period of the secondary current is set to less than 250 ns, whereby a laser oscillating operation for each pulse is performed by the first half-cycle of the waveform of the primary discharge oscillating current, on which the secondary current is superimposed, together with at least four half-cycles or two half-cycles subsequent to the first half-cycle. Accordingly, it is possible to realize a high-repetition rate and narrow-linewidth ArF excimer laser apparatus for semiconductor lithography capable of operating stably with a stretched pulse width even when the repetition rate is 4 kHz or higher. In addition, it is possible to realize high-repetition rate and narrow-linewidth KrF excimer laser apparatus and fluorine laser apparatus for semiconductor lithography capable of operating stably with a stretched pulse width even when the repetition rate is 2 kHz or higher.

What we claim is:

1. ArF and KrF excimer laser apparatus and fluorine laser apparatus for lithography, each comprising:

a laser chamber;

a magnetic pulse compression circuit;

a pair of laser discharge electrodes connected to output terminals of said magnetic pulse compression circuit and disposed in said laser chamber; and a peaking capacitor connected in parallel to said pair of laser discharge electrodes;

wherein, when a capacity of a capacitor in a final stage of said magnetic pulse compression circuit is denoted by Cn (n is the number of stages of the magnetic pulse compression circuit); a capacity of the peaking capacitor is denoted by Cp; an inductance of a first circuit loop formed by the capacitor in the final stage and the laser discharge electrodes is denoted by Ln; and an inductance of a second circuit loop formed by the peaking capacitor and the laser discharge electrodes is denoted by Lp;

a relationship between a period Tn of a waveform of an oscillating current flowing in the first circuit loop, i.e. Tn=2π√(Ln×Cn), and a period Tp of a waveform of an oscillating current flowing in the second circuit loop, i.e. Tp=2π√(Lp×Cp), satisfies the following condition:

$$5Tp<Tn$$

and the period Tn satisfies the following condition:

$$Tn<250\ ns$$

whereby a laser oscillating operation is performed by at least 2.5 cycles of an oscillating current flowing between the laser discharge electrodes.

2. ArF and KrF excimer laser apparatus and fluorine laser apparatus for lithography, each comprising:

a laser chamber;

a magnetic pulse compression circuit;

a pair of laser discharge electrodes connected to output terminals of said magnetic pulse compression circuit and disposed in said laser chamber; and a peaking capacitor connected in parallel to said pair of laser discharge electrodes;

wherein, when a capacity of a capacitor in a final stage of said magnetic pulse compression circuit is denoted by Cn (n is the number of stages of the magnetic pulse compression circuit); a capacity of the peaking capacitor is denoted by Cp; an inductance of a first circuit loop formed by the capacitor in the final stage and the laser discharge electrodes is denoted by Ln; and an inductance of a second circuit loop formed by the peaking capacitor and the laser discharge electrodes is denoted by Lp;

a relationship between a period Tn of a waveform of an oscillating current flowing in the first circuit loop, i.e. $Tn=2\pi\sqrt{(Ln \times Cn)}$, and a period Tp of a waveform of an oscillating current flowing in the second circuit loop, i.e. $Tp=2\pi\sqrt{(Lp \times Cp)}$, satisfies the following condition:

$$3Tp < Tn < 5Tp$$

and the period Tn satisfies the following condition:

$$Tn < 250 \; ns$$

whereby a laser oscillating operation is performed by at least 1.5 cycles of an oscillating current flowing between the laser discharge electrodes.

3. ArF and KrF excimer laser apparatus and fluorine laser apparatus for lithography according to claim 1 or 2, wherein the laser discharge electrodes have a length of 600 to 750 mm and a gap of 15 to 18 mm, and wherein an overall gas pressure in the laser chamber is 2 to 4 atmospheric pressure, and a fluorine concentration in the laser chamber is not more than 0.15%, and further the capacity Cn of the capacitor in the final stage is not less than 8 nF.

4. ArF and KrF excimer laser apparatus and fluorine laser apparatus for lithography according to any one of claims 1 to 3, wherein a capacitor for preionization is connected in parallel to the peaking capacitor and in series to corona preionization electrodes, wherein a combined capacity Cc of an electrostatic capacity of said corona preionization electrodes and a capacity of said capacitor for preionization is not more than 5% of the capacity Cp of the peaking capacitor.

5. ArF and KrF excimer laser apparatus and fluorine laser apparatus for lithography according to any one of claims 1 to 4, wherein an output mirror of an optical resonator has a reflectance of not less than 40%.

* * * * *